Patented Sept. 26, 1933

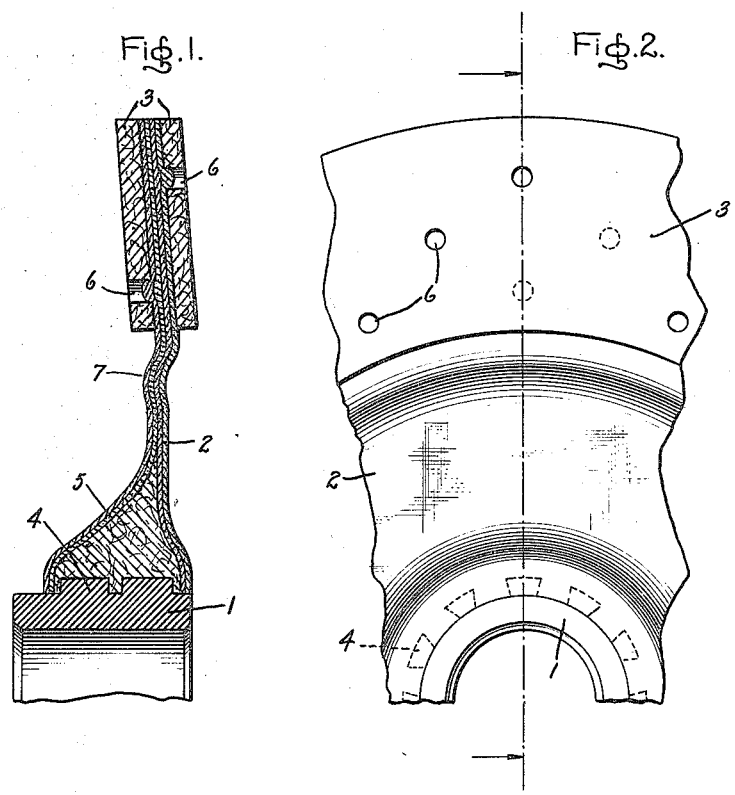

1,928,463

UNITED STATES PATENT OFFICE 1,928,463

CLUTCH PLATE AND METHOD OF MANUFACTURING THE SAME

Henry M. Richardson, Lynn, and Clarence W. Mansur, Malden, Mass., assignors to General Electric Company, a corporation of New York Application May 21, 1930. Serial No. 454,446

7 Claims. (Cl. 192—68)

The present invention relates to clutch plates such as are used in connection with automobile clutches, for example, and has for its object to provide an improved construction of clutch plate and an improved method of manufacturing the same.

For a consideration of what we believe to be novel and our invention, attention is directed to the following specification and the claims appended thereto.

In the drawing, Fig. 1 is a transverse sectional view of a clutch plate embodying our invention, and Fig. 2 is a face view of a part of the clutch plate.

Referring to the drawing, 1 indicates the hub of the clutch plate, 2 indicates the web, and 3 indicates the facings of friction material, termed usually the clutch facings, attached to the peripheral portion of the web.

According to our invention we construct the clutch plate entirely by molding, the web 2 being molded onto the hub 1, and the friction clutch facings 3 being molded directly to the web 2. The hub 1 is formed from a suitable metal and is provided with a serrated or knurled outer surface providing projections 4 onto which the web is molded. This serves to provide a strong bond between the hub and the web. The web is formed from woven textile material such as cotton duck, united by a resinous compound which is converted by heat or by heat and pressure into an infusible insoluble state. As a resinous compound we use preferably a phenolic condensation product. The central portion of the web is enlarged or thickened by inserting between the sheets or plys of woven textile material a filling ring 5 which may be formed from small pieces of woven textile material united by a resinous condensation product or from other suitable textile material united in the same way. The friction clutch facings may be formed from any suitable clutch facing material such as are now known. Such material comprises usually asbestos united by a suitable adhesive substance. We have found that friction clutch facing material of this kind or friction clutch facing material comprising woven asbestos of suitable thickness can be molded directly to a woven textile material united by a resinous compound and that the bond between the two will be as strong or stronger than the friction surfacing material itself. We thus provide what is, in substance, an integral structure comprising the central web portion and the friction clutch facing material. If desired, we may provide spaced indentations or holes 6 in the clutch facing material into which material of the web is pressed to increase the holding connection between the two. However, ordinarily this is found to be not necessary. Also, the web may be provided with an annular bead or offset 7 to stiffen it somewhat and maintain it always in the same plane.

Preferably, the web is formed so that its peripheral portion is offset or dished from the vertical by an angle of the border of 3° to 5°, as is shown in Fig. 1. This offsetting or dishing may be effected when the structure is molded, a thing of substantial advantage from a manufacturing standpoint.

In constructing the clutch plate, we provide a mold of the required contour and assemble the several parts in the mold, it being understood that the sheets forming the web and the material forming the filling ring 5 have been previously treated with a resinous compound in the uncured state. The ring 5 of the hub may be pre-formed if found desirable by giving it a preliminary pressing, sufficient heat being applied to soften the resinous compound and cause the parts to stick together. The clutch facings are laid in the mold one on each side of the web and in the positions they occupy in the completed structure. The molds, with the parts assembled therein, are then placed in a suitable press and pressure and heat applied to consolidate the assemblage and cure the resinous compound. When the parts are compressed in the mold, the material of the web and of the filling ring 5 will flow into the spaces between the projections 4 on the hub to form a tight bond. Also, some material will flow into the indentations or holes 6, if such indentations or holes are provided, after the manner indicated in Fig. 1 of the drawing.

By our invention, it will be seen that we provide a construction wherein rivets are not required for fastening the clutch facings to the web. When rivets are used for this purpose they necessarily project part way into the clutch facings and when the clutch facings wear down to the rivets the clutch plate must be then discarded. In our construction, wherein no rivets are utilized, the clutch facings may be used until they are worn down entirely to the web. This means that if clutch facings of the thickness ordinarily provided are used, the clutch plate will have a substantially longer life; or, on the other hand, a clutch plate having a life equal to clutch plates as ordinarily constructed may be produced by using clutch facings of thickness less than heretofore used. If constructed in the latter way, this means that there is an appreciable saving in the cost of clutch facing material, which material is relatively expensive.

Another and an important advantage of a clutch plate constructed in accordance with our invention resides in the fact that it is lighter in weight by a substantial amount than clutch plates having webs made of metal, whereby there is provided a clutch plate having a much lower moment of inertia. This is of advantage in that it reduces the amount of clutch spinning when the clutch is disengaged, thus allowing greater ease and speed of gear shifting without clashing of the mating gears.

Also, a clutch plate having a web as described, has the advantage that it introduces a certain amount of flexibility into the clutch plate, which produces a more even action of the clutch. Also, a clutch plate as described has the advantage that it will absorb and dampen out engine vibrations thus preventing their transmission from the engine to the gear box when they cause chattering of the gears.

What we claim as new and desire to secure by Letters Patent of the United States is:

1. A clutch plate comprising a web formed of layers of woven textile material united by a resinous compound and fricton facings united to said web by the adhesive properties of said resinous compound whereby the friction facings and layers form an integral unitary structure.

2. A clutch plate comprising a metal hub, a web formed from layers of woven textile material united by a resinous compound, and friction facings on the web, said hub, web and facings being united to each other by the adhesive properties of the resinous compound to form a unitary structure.

3. The method of manufacturing a clutch plate which comprises assembling layers of woven textile material treated with uncured resinous compound to form a web, positioning friction surfacing material on said layers, and molding the assemblage with heat and pressure to cure the resinous compound and unite the friction surfacing material to said layers and the layers to each other by the adhesive properties of said resinous compound.

4. The method of manufacturing a clutch plate which comprises taking a metal hub, assembling layers of woven textile material treated with uncured resinous compound about the hub to form a web, positioning fricton surfacing material on said layers, and molding the assemblage with heat and pressure to cure the resinous compound and unite the friction surfacing material to the layers and the layers to each other and to the hub, the friction surfacing material being united to said layers by the adhesive properties of said resinous compound whereby the fricton surfacing material and the layers provide a unitary structure.

5. A clutch plate comprising a metal hub, a web formed from layers of woven textile material united by a resinous compound and a filling ring of simlar material at the central portion of the web, and friction facings on the web, said hub, web and facings being molded together to form a unitary structure.

6. A clutch plate comprising a web formed of layers of woven textile material united by a resinous compound, and friction facings united to said web by said resinous compound, said web being provided with an offset portion to stiffen it.

7. A clutch plate comprising a web formed of layers of woven cloth united by a resinous compound, and friction facings comprising asbestos material moulded directly to said web and united thereto by the resinous compound to form an integral unitary part thereof.

HENRY M. RICHARDSON.
CLARENCE W. MANSUR.